(12) United States Patent
Mathai et al.

(10) Patent No.: US 8,437,592 B2
(45) Date of Patent: May 7, 2013

(54) OPTICAL CHANNEL TAP ASSEMBLY

(75) Inventors: Sagi Varghese Mathai, Palo Alto, CA (US); Paul Kessler Rosenberg, Sunnyvale, CA (US); Wayne V. Sorin, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 12/907,662

(22) Filed: Oct. 19, 2010

(65) Prior Publication Data

US 2012/0093459 A1  Apr. 19, 2012

(51) Int. Cl.
*G02B 6/26*        (2006.01)
*G02B 27/10*       (2006.01)

(52) U.S. Cl.
USPC ................................ 385/48; 385/47; 359/629

(58) Field of Classification Search .................... 385/48; 359/629
See application file for complete search history.

(56) References Cited

U.S. PATENT DOCUMENTS

| | | | |
|---|---|---|---|
| 6,928,219 B2 | 8/2005 | Arkas | |
| 7,088,199 B2 | 8/2006 | Bartley et al. | |
| 7,116,869 B2 * | 10/2006 | Moore | 385/48 |
| 7,477,809 B1 | 1/2009 | Tan et al. | |
| 7,499,615 B2 | 3/2009 | Tan et al. | |
| 2009/0028502 A1 * | 1/2009 | Presley et al. | 385/18 |
| 2009/0097851 A1 | 4/2009 | Tan et al. | |
| 2011/0164875 A1 * | 7/2011 | Bicknell et al. | 398/43 |

OTHER PUBLICATIONS

Tan et al., A High-Speed Optical Multi-drop Bus for Computer Interconnections, 16th IEEE Symposium on High Performance Interconnects, 2008.
Hiramatsu et al., Optical Backplane Connectors Using Three-Dimensional Waveguide Arrays, Journal of Lightwave Technology, vol. 25, No. 9, Sep. 2007, pp. 2776-2782.
Yang et al., Array Waveguide Evanescent Ribbon Coupler for Card-To-Backplane Optical Interconnects, Optics Letters, vol. 32, No. 1, Jan. 1, 2007, pp. 14-16.

* cited by examiner

*Primary Examiner* — Omar Rojas

(57) ABSTRACT

An optical channel tap assembly comprises a first N by M waveguide array including a first set of optical channels to convey optical signals along a first set of conveyance paths. The optical channel tap assembly also comprises a second N by M waveguide array including a second set of optical channels to convey the optical signals along a second set of conveyance paths, the optical signals received from the first set of conveyance paths. Additionally, the optical channel tap assembly comprises a beam splitter, disposed between the first N by M waveguide array and the second N by M waveguide array, to divert a first portion of power from the optical signals away from the second N by M waveguide array while allowing a second portion of power from the optical signals to propagate into the second N by M waveguide array.

20 Claims, 4 Drawing Sheets

```
┌─────────────────────────────────────┐
│ Disposing a second N by M waveguide array        │
│ proximate to a first N by M waveguide array, the first │ ─── 500
│ N by M waveguide array including a first set of       │
│ optical channels to convey optical signals along a    │
│ first set of conveyance paths, the second N by M      │
│ waveguide array including a second set of optical     │
│ channels to convey the optical signals along a        │
│ second set of conveyance paths, said optical signals  │
│ received from the first set of conveyance paths       │
└─────────────────────────────────────┘
                    │
                    │
┌─────────────────────────────────────┐
│ Disposing a beam splitter between the first N by M    │
│ waveguide array and the second N by M waveguide       │ ─── 510
│ array, to divert a first portion of power from the    │
│ optical signals away from the second N by M           │
│ waveguide array while allowing a second portion of    │
│ power from the optical signals to propagate into the  │
│ second N by M waveguide array                         │
└─────────────────────────────────────┘
```

*FIG. 6*

OPTICAL CHANNEL TAP ASSEMBLY

BACKGROUND

Optical interconnects are increasing in popularity because of their performance potential with lower susceptibility to electromagnetic interference, low power consumption, and small capacitive effects. One of the simplest and most widely used optical interconnects for digital data transmission is the backplane system, which is used in network routers, servers, and multiprocessor calculations, among other things. On a backplane, an optical interconnect can "multi-drop" to serve multiple devices connected to the optical interconnect. At each "drop" there is an optical channel tap that can connect to a device. Some optical interconnects include multiple channels that occupy relatively large amounts of space on backplanes, which contributes to overcrowded backplanes.

BRIEF DESCRIPTION OF THE DRAWINGS

FIG. 6 is a flow diagram of a method in accordance with an example of the present disclosure.

DETAILED DESCRIPTION

Figure 1:
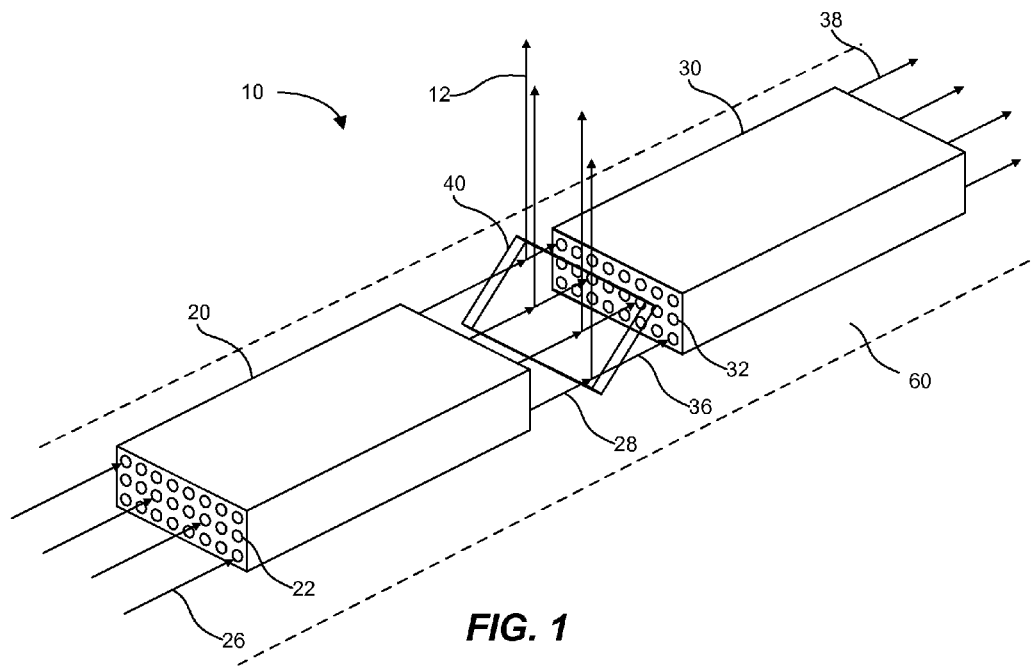
FIG. 1 is a top perspective view of an optical channel tap assembly in accordance with an example of the present disclosure.

Reference will now be made to certain examples, and specific language will be used herein to describe the same. Examples discussed herein set forth an optical channel tap assembly and an optical channel multi-tap assembly system that can support multiple channels while occupying less space on the backplane. In particular examples, the optical channel tap assembly can include lenses that collimate and/or focus optical signals.

Specifically, an optical channel tap assembly can comprise a first N by M waveguide array including a first set of optical channels to convey optical signals along a first set of conveyance paths. The optical channel tap assembly can also comprise a second N by M waveguide array including a second set of optical channels to convey the optical signals along a second set of conveyance paths, the optical signals received from the first set of conveyance paths. Additionally, the optical channel tap assembly can comprise a beam splitter, disposed between the first N by M waveguide array and the second N by M waveguide array, to divert a first portion of power from the optical signals away from the second N by M waveguide array while allowing a second portion of power from the optical signals to propagate into the second N by M waveguide array.

In another example, an optical channel multi-tap assembly system can comprise a first optical channel tap assembly having a first beam splitter to divert a first portion of power from optical signals conveyed from a first set of optical channels of a first N by M waveguide array away from a second set of optical channels of a second N by M waveguide array while allowing a second portion of power from the optical signals to propagate into the second N by M waveguide array. The system can also include a second optical channel tap assembly having a second beam splitter to divert a third portion of power from optical signals conveyed from a third N by M waveguide array away from a fourth N by M waveguide array while allowing a fourth portion of power from the optical signals to propagate into the fourth N by M waveguide array. In this example, the second optical channel tap assembly is optically coupled to the first optical channel tap assembly.

Furthermore, a method of making an optical channel tap assembly in accordance with the principles herein comprises disposing a second N by M waveguide array proximate to a first N by M waveguide array, the first N by M waveguide array including a first set of optical channels to convey optical signals along a first set of conveyance paths, the second N by M waveguide array including a second set of optical channels to convey the optical signals along a second set of conveyance paths, the optical signals received from the first set of conveyance paths. Additionally, the method can comprise disposing a beam splitter between the first N by M waveguide array and the second N by M waveguide array to divert a first portion of power from the optical signals away from the second N by M waveguide array while allowing a second portion of power from the optical signals to propagate into the second N by M waveguide array.

With these general examples set forth above, it is noted in the present disclosure that the N dimension represents a height of the waveguide array and the M dimension represents a width of the waveguide array. The dimensions of an N by M waveguide array are such that N is an integer greater than one and M is an integer greater than or equal to one.

It is also noted that when describing the optical channel tap assembly, or the related system or method, each of these descriptions are considered applicable to the other, whether or not they are explicitly discussed in the context of that embodiment. For example, in discussing the optical channel tap assembly per se, the system and/or method embodiments are also included in such discussions, and vice versa.

Furthermore, various modifications and combinations can be derived from the present disclosure and illustrations, and as such, the following figures should not be considered limiting.

Illustrated in FIG. 1 is an optical channel tap assembly 10. For simplicity, the optical channel tap assembly 10 is shown independent of a backplane. The optical channel tap assembly 10 can be mounted, installed, or otherwise associated with the backplane such that the backplane supports the optical channel tap assembly 10. Typically, the optical channel tap assembly 10 is supported by the backplane in a manner that allows an optical device to couple with the optical channel tap assembly 10.

The optical channel tap assembly 10 can comprise a first N by M waveguide array 20, a second N by M waveguide array 30, and a beam splitter 40. In some instances, the optical channel tap assembly 10 is connected to, or incorporates, a substrate shown schematically at 60. In a specific example, the substrate can be the backplane. In another specific example, the substrate can function to maintain the various components of the optical channel tap assembly 10 in position relative to one another and/or to facilitate coupling with the backplane. In this case, the substrate can serve to maintain the components of the optical channel tap assembly 10 in a single assembled unit that can then be installed on the backplane. The substrate can comprise a housing, brackets, alignment pins, etc. In one aspect, the first and second N by M waveguide arrays 20, 30 can be constructed of a single unitary part, such as by a mold. In another aspect, the first and second N by M waveguide arrays 20, 30 and the beam splitter 40 can be made of a single unitary part.

The first and second N by M waveguide arrays 20, 30 can include a set of optical channels 22, 32 to convey optical signals 26, 36 along a set of conveyance paths. The conveyance paths can be formed by the optical channels 22, 32. For example, optical signals 26 can enter the first N by M waveguide array 20 and proceed along the set of conveyance paths formed by the set of optical channels 22. Optical signals 28 indicate optical signals that have exited the first N by M waveguide array 20. Similarly, optical signals 36 can enter the second N by M waveguide array 30 and proceed along the set of conveyance paths formed by the set of optical channels 32. Optical signals 38 indicate optical signals that have exited the second N by M waveguide array 30. The first and second N by M waveguide arrays 20, 30 of the optical channel tap assembly 10 are arranged such that optical signals can be received by the second N by M waveguide array 30 from the first N by M waveguide array 20. In one aspect, this arrangement of the N by M waveguide arrays is linear or, in other words, the first and second N by M waveguide arrays 20, 30 are collinear with one another.

Typically, when multiple optical channels have been used, they have been arranged in a one-dimensional array with the optical channels positioned side-by-side on the backplane. Increasing the number of optical channels, therefore, increases the width of the array and the amount of space that the waveguides occupy on the backplane. The N by M waveguide array of the present disclosure, however, minimizes space occupied on the backplane when increasing the number of optical channels because the optical channels are arranged in a two-dimensional array, i.e. N representing height and M representing width as set forth above. Thus, the N by M waveguide array improves channel density and increases aggregate backplane bandwidth compared to a one-dimensional waveguide array of the same width.

Examples of the N by M waveguide arrays that can be used include those made of polymers and glass. Waveguides can be solid or hollow, such as light pipes. Light pipes are hollow pipes that guide light. An example of a light pipe is a hollow metal waveguide. Hollow metal waveguides have a metal coating on the inside of the pipe that guides light with low loss.

In one example, a hollow waveguide is a large core hollow waveguide, which has a diameter (or width and/or height) on the order of 50 to 150 or more times the wavelength of the coherent light the waveguide is configured to guide. The large core hollow waveguide can have a cross-sectional shape that is square, rectangular, round, elliptical, or some other shape configured to guide an optical signal. Furthermore, because the waveguide is hollow, the light essentially travels at the speed of light in air or a vacuum. In one aspect, the hollow waveguide has an air core.

As shown in FIG. 1, the beam splitter 40 can be disposed between the first N by M waveguide array 20 and the second N by M waveguide array 30. In one example, the beam splitter 40 is a pellicle beam splitter. Pellicle beam splitters with suitable optical coatings can be configured to yield a predetermined amount of reflectivity, transmissivity, and known optical loss. The beam splitter optical coatings used can be non-polarizing to minimize any differences between the reflectivity/transmissivity as a function of input polarization of light. Pellicle beam splitters also minimize or eliminate ghosting and beam walk-off issues. The beam splitter 40 can also be fabricated on glass, plastic, and/or semiconductor substrates, for example.

The beam splitter 40 diverts a first portion of power from the optical signals away from the second N by M waveguide array 30 while allowing a second portion of power from the optical signals to propagate into the second N by M waveguide array 30. The optical signal 28 exiting the first N by M waveguide array has a given power prior to the beam splitter 40. The beam splitter 40 diverts the optical signal 12 and, thus, a (first) portion of the power of optical signal, away from the second N by M waveguide array 30. Optical signal 36 passes through the beam splitter 40 toward the second N by M waveguide array 30 and has the remaining (second) portion of power from the optical signal.

In one aspect, the beam splitter 40 splits the optical signal according to a power ratio of the first portion of power and the second portion of power. This ratio can be fixed or variable. The amount of power diverted by the beam splitter 40 and the amount of power that passes through the beam splitter 40 can be determined by the reflectivity and transmissivity of the beam splitter 40. In other words, the power ratio of the beam splitter is adjustable by varying the reflectivity/transmissivity (R/T) ratio of the beam splitter 40.

The beam splitter 40 can divert the first portion of power away from the second N by M waveguide array 30 at a right angle relative to the optical signals 36 that propagate into the second N by M waveguide array 30. In one example, the beam splitter 40 is positioned at about a 45 degree angle relative to the optical signal 28 approaching the beam splitter 40 and the optical signal 36 that passed through the beam splitter 40. In one example, the optical signal 28 and the optical signal 36 are substantially collinear with one another. The beam splitter 40 angle relative to the optical signal 28 is not limited to 45 degrees and may fall between 0 and 90 degrees according to the specific implementation.

The first and second N by M waveguide arrays 20, 30 can also be increased in size compared to one-dimensional waveguide arrays. Accordingly, the beam splitter 40 may also be increased in size. A larger beam splitter is, therefore, can be less fragile than its one-dimensional counterpart. That being said, in some examples, the increased size can impact the performance of the optical channel tap assembly 10. For instance, the larger components can result in increased spacing between the components. Generally, the optical signal 36 that has passed through the beam splitter 40 is on-axis with the optical channels 32 such that the optical signal 36 enters the optical channels 32 of the second N by M waveguide array 30. With an increased thickness of the beam splitter 40, the beam can walk-off due to the thickness of the beam splitter material such that more of the pass through optical signal 36 hits the waveguide walls rather than the core of the optical channels 32. This can result in high loss and crosstalk due to the finite area of the optical channels 32 and the pitch of the optical channels 32 in the array.

Various techniques are available to compensate for beam walk-off. For example, a piece of glass that produces a similar beam walk-off to the beam splitter, can be oriented to receive optical signals 180 degrees relative to the orientation of the first beam splitter. In other words, the beam splitter and the glass are oriented in a back-to-back configuration. This orientation of the glass causes beam walk-off in the opposite direction of the beam walk-off caused by the beam splitter. Thus, beam walk-off due to the beam splitter can be "undone" by the redirection of the beam caused by the glass. With this technique, the first and second N by M waveguide arrays 20, 30 can be on the same axis. Another beam walk-off compensation technique is to position the second N by M waveguide array off axis from the first N by M waveguide array such that the second N by M waveguide array is positioned to receive the off axis beam from the beam splitter.

Figure 2:
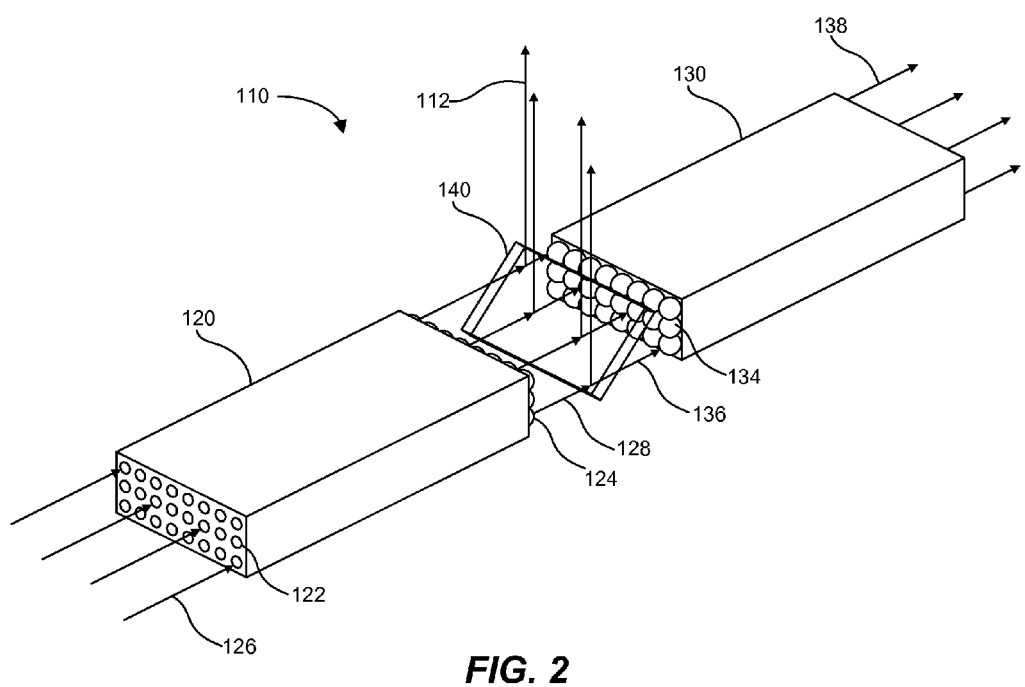
FIG. 2 is a top perspective view of an optical channel tap assembly in accordance with another example of the present disclosure.

Referring to FIG. 2, illustrated is another example of an optical channel tap assembly. In this example, the structures and optical signals shown in the optical channel tap assembly 110 are similar to those shown above in FIG. 1. Specifically shown are the first N by M waveguide array 120, the second N by M waveguide array 130, the beam splitter 140, optical channels 122, and optical signals 112, 126, 128, 136, 138. This example illustrates that the optical channel tap assembly 110 can also include a first set of lenses 124 disposed between the first N by M waveguide array 120 and the second N by M waveguide array 130. The lenses 124 relay the optical signals upon exiting the first set of optical channels 122 to the entrance of the second N by M waveguide array 130. As the optical signals exit the first N by M waveguide array, they can benefit from lenses 124 to improve the condition of the optical signals prior to the beam splitter 140. The lenses 124, for example, can collimate the optical signal beam, therefore, resulting in an improved beam for the beam splitter 140. The lenses 124 are arranged to match the N by M array of the first N by M waveguide array 120.

This example further illustrates that the optical channel tap assembly 110 can also include a second set of lenses 134 disposed between the first N by M waveguide array 120 and the second N by M waveguide array 130. The lenses 134 efficiently couple the optical signals 136 to enter the second set of optical channels of the second N by M waveguide array 130. The lenses 134 are arranged to match the N by M array of the second N by M waveguide array 130. After the optical signal 136 passes through the beam splitter 140, the optical signal 136 can benefit from lenses 134 to improve the optical signals 136 prior to entering the second N by M waveguide array 130. For example, the optical signals 136 can be larger than one or more of the entrances to the optical channels of the second N by M waveguide array. In this case, the lenses 134 cause the optical signal 136 to focus and fit into the optical channels. Additionally, the lenses 134 can collimate the optical signal 136 to help the optical signal beam to remain parallel as it travels along the optical channels of the second N by M waveguide array 130. Lenses 134, therefore, can improve guidance of the optical signal 136 into and through the second N by M waveguide array 130. This can be particularly beneficial for waveguide arrays composed of hollow waveguides.

Figure 3:
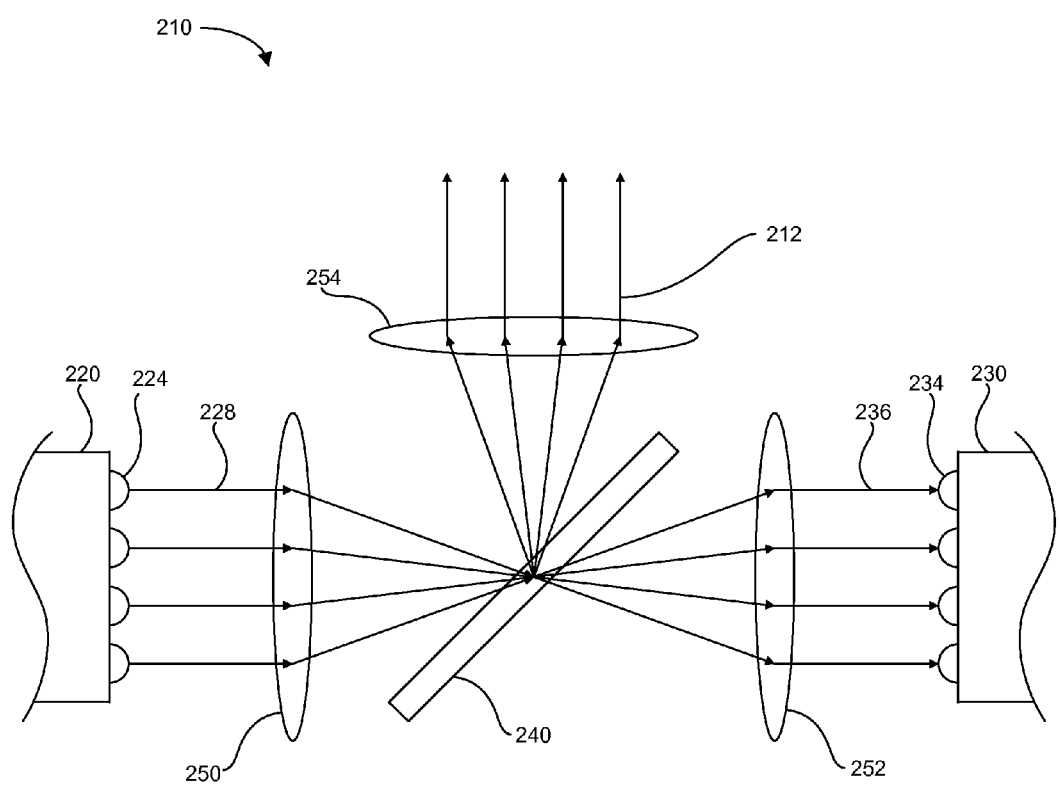
FIG. 3 is a side view of an optical channel tap assembly in accordance with a further example of the present disclosure.

Referring to FIG. 3, illustrated is a side view of an optical channel tap assembly 210. In this example, the structures and optical signals shown in the optical channel tap assembly 210 are similar to those shown above in FIGS. 1 and 2. Specifically shown are the first N by M waveguide array 220, the second N by M waveguide array 230, the beam splitter 240, the first set of lenses 224, the second set of lenses 234, and optical signals 212, 228, 236. This example illustrates that the optical channel tap assembly 210 can also include telecentric lenses 250, 252, 254. The illustrated configuration, and variations thereof, can relay optical signals over a larger distance than in other examples, and can minimize negative effects due to the increased size of the optical channel tap assembly components and the spacing between them.

As shown in FIG. 3, telecentric lens 250 can be disposed between the first N by M waveguide array 220 and the second N by M waveguide array 230 in a telecentric arrangement with the beam splitter 240 and the first N by M waveguide array 220. In another aspect, telecentric lens 252 can be disposed between the first N by M waveguide array 220 and the second N by M waveguide array 230 in the telecentric arrangement shown with the beam splitter 240 and the second N by M waveguide array 230.

In particular, telecentric lens 250 can be disposed between the first N by M waveguide array 220 and the beam splitter 240, wherein lens 250 delivers the optical signal 228 to the beam splitter 240. As illustrated, the optical signal 228 can be collimated by lenses 224 upon exiting the first N by M waveguide array 220. However, the assembly 210 need not include lenses 224. Furthermore, the assembly 210 can include telecentric lens 252 disposed between the beam splitter 240 and the second N by M waveguide array 230. In this configuration, telecentric lens 252 delivers the pass through optical signal 236 to the second N by M waveguide array 230, which can include lenses 234 for focusing and/or collimating the optical signal 236 prior to entering the waveguides. As with lenses 224, the assembly 210 need not include lenses 234. Telecentric lens 254 can be disposed relative to the beam splitter 240 to receive the optical signal 212, which is diverted by the beam splitter 240. Telecentric lens 254 can deliver the optical signal 212 to an optical device (not shown).

Figure 4:
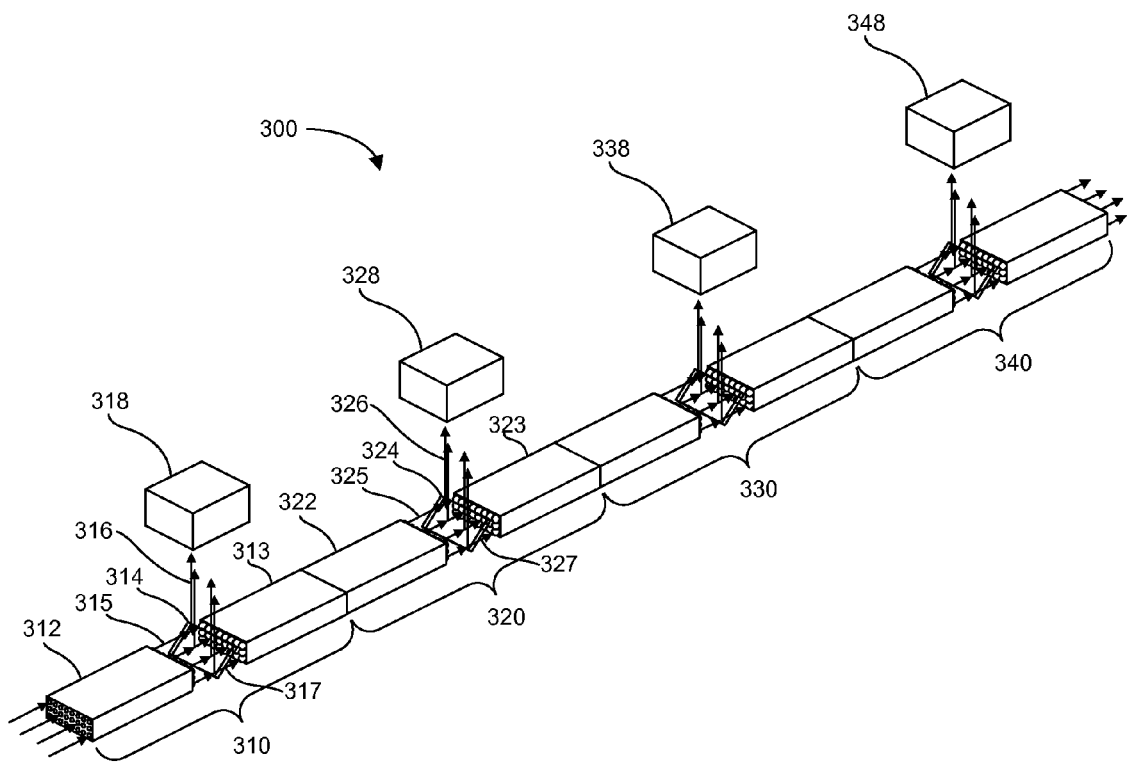
FIG. 4 is a top perspective view of an optical channel multi-tap assembly system in accordance with an example of the present disclosure.

Referring to FIG. 4, illustrated is a top perspective view of an optical channel multi-tap assembly system 300. In this example, the system comprises a plurality of optical channel tap assemblies, such as any of optical channel tap assemblies 10, 110, and 210, described above with reference to FIGS. 1, 2, and 3, respectively. In accordance with this example, the optical channel multi-tap assembly system 300 can include any number of a plurality of optical channel tap assemblies. Specifically shown are optical channel tap assemblies 310, 320, 330, and 340. The number of optical channel tap assemblies shown in FIG. 4 is merely illustrative, and could be more or less than what is shown.

In general, the optical channel multi-tap assembly system 300 comprises multiple optical channel tap assemblies, as described above, optically coupled together. Accordingly, the optical channel multi-tap assembly system 300 comprises a first optical channel tap assembly 310 having a first beam splitter 314. The first beam splitter 314 diverts a first portion of power (of optical signal 316) from optical signals 315 conveyed from a first set of optical channels of a first N by M waveguide array 312 away from a second set of optical channels of a second N by M waveguide array 313. The beam splitter 314 also allows a second portion of power from the optical signals 317 to propagate into the second N by M waveguide array 313. A second optical channel tap assembly 320 is optically coupled to the first optical channel tap assembly 310. The second optical channel tap assembly 320 has a second beam splitter 324 to divert a third portion of power (of optical signal 326) from optical signals 325 conveyed from a third N by M waveguide array 322 away from a fourth N by M waveguide array 323. The beam splitter 324 also allows a fourth portion of power from the optical signals 327 to propagate into the fourth N by M waveguide array 323. Thus, multiple optical channel tap assemblies 310, 320 are optically coupled together to form all or part of a system 300.

Each beam splitter 314, 324 in the system 300 diverts power that can be tapped into by an optical device. For example, the system 300 can include optical devices 318, 328, 338, 348. Accordingly, the optical channel multi-tap assembly system 300 further comprises a first optical device 318 optically coupled to the first optical channel tap assembly 310 to receive the first portion of power (of optical signal 316) from the optical signals.

Examples of optical devices include optical channel tap assemblies, lenses, waveguides, optical to electrical (O/E)

conversion devices, electrical to optical (E/O) conversion devices, or terminal devices such as memory devices.

In other words, an optical device includes an optical interface. Thus, an optical device can be a device that is primarily electrical if the device includes an O/E conversion device and/or an E/O conversion device.

The system 300 can also be used in reverse. In this case an optical device, such as an E/O device, can transmit optical signals into an optical tap assembly. Thus, the system 300 can be used in the reciprocal direction to couple optical beams from optical devices into the N by M waveguide arrays of the optical channel tap assemblies.

Each optical channel tap assembly can divert a predetermined amount of power from an optical signal in accordance with the beam splitter's power ratio relationship. The diverted optical signal is sent to its associated optical device, and each beam splitter passes through the remainder of the optical signal that has a power determined by the beam splitter's respective power ratio relationship. The predetermined power diverted by each beam splitter can be substantially the same amount of power.

The beam splitters of the optical channel multi-tap assembly system 300, such as beam splitters 314, 324, can be adjusted to account for an increase or decrease in the amount of optical channel tap assemblies present in the system 300 at a given time. For example, if no optical device is present or optically connected to an optical channel tap assembly, the power to be diverted by the beam splitter of the assembly can be reduced to zero by reducing the reflectivity to zero. Alternatively, the power can be reduced to zero by adjusting the beam splitter so that it is no longer in the path of the optical signal.

As the optical signal passively passes through the beam splitters in the optical channel multi-tap assembly 300, the signal loses (diverted) power at each beam splitter. To achieve the same diverted power at each optical channel tap assembly, the reflectivity and transmissivity are varied for each beam splitter, such that the ratio relationships have an increasing reflectivity and decreasing transmissivity from the first beam splitter to the last beam splitter in the direction of travel of the optical signal. Because the power received at each beam splitter is different, the power ratio at each beam splitter is adjusted to draw a different percentage of power from the optical signal it receives in order to reflect the same predetermined power output from each of the beam splitters.

For example, to divert the same amount of power at each optical channel tap assembly in the system 300, assuming no power loss in the waveguides and gaps between waveguides, and ideal beam splitters, the beam splitters of each optical channel tap assembly have reflectivity/transmissivity (R/T) ratios as follows: assembly 310 (0.25/0.75), assembly 320 (0.33/0.67), assembly 330 (0.5/0.5), and assembly 340 (1/0).

Figure 5:
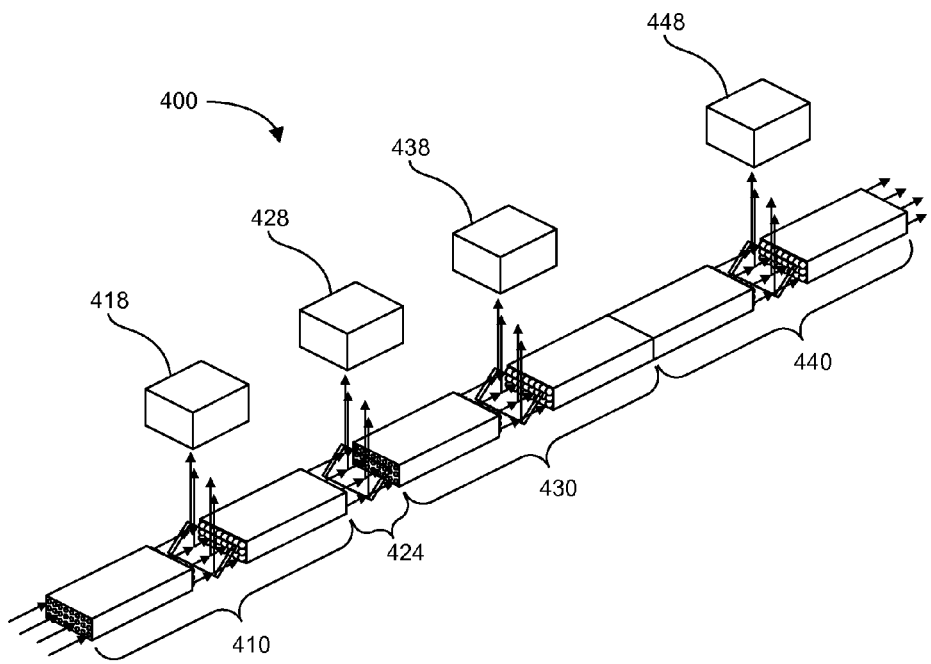
FIG. 5 is a top perspective view of an optical channel multi-tap assembly system in accordance with another example of the present disclosure.

Referring to FIG. 5, illustrated is a top perspective view of an optical channel multi-tap assembly system 400. In this example, the structures and optical signals shown in the optical channel tap assembly 110 are similar to those shown above in FIG. 4. Specifically shown are optical channel tap assemblies 410, 430, and 440 along with optical devices 418, 428, 438, and 448. This example illustrates that the optical channel multi-tap assembly system 400 can include a beam splitter 424 optically coupled to the optical channel tap assemblies. Specifically, the optical channel tap assembly 430 is optically coupled to the optical channel tap assembly 410 through beam splitter 424. As shown in FIG. 5, the optical channel multi-tap assembly system 400 can selectively include the beam splitter 424 optically coupled between any two optical channel tap assemblies. For example, beam splitter 424 is optically coupled between optical channel tap assemblies 410 and 430. On the other hand, optical channel tap assemblies 430 and 440 are optically coupled to one another without a beam splitter optically coupled between them, as in the example illustrated in FIG. 4.

In one aspect, the optical channel multi-tap assembly system 400 can include lenses disposed between the optical channel tap assembly 410 and the beam splitter 424. In another aspect, the optical channel multi-tap assembly system 400 can include lenses disposed between the beam splitter 424 and the optical channel tap assembly 430. The lenses function as described above.

In a related embodiment, and to reiterate to some degree, a method of making an optical channel tap assembly in accordance with the principles herein is shown in FIG. 6. The method comprises disposing a second N by M waveguide array proximate to a first N by M waveguide array, the first N by M waveguide array including a first set of optical channels to convey optical signals along a first set of conveyance paths, the second N by M waveguide array including a second set of optical channels to convey the optical signals along a second set of conveyance paths, the optical signals received from the first set of conveyance paths 500. Additionally, the method comprises disposing a beam splitter between the first N by M waveguide array and the second N by M waveguide array, to divert a first portion of power from the optical signals away from the second N by M waveguide array while allowing a second portion of power from the optical signals to propagate into the second N by M waveguide array 510. It is noted that no specific order is required in this method, though generally in one embodiment, these method steps can be carried out sequentially.

In one aspect, the method further comprises disposing lenses between the first N by M waveguide array and the second N by M waveguide array, wherein the lenses collimate optical signals upon exiting the first set of optical channels. In another aspect, the method comprises disposing lenses between the first N by M waveguide array and the second N by M waveguide array, wherein the lenses focus optical signals to enter the second set of optical channels of the second N by M waveguide array.

While the foregoing examples are illustrative of the principles and concepts discussed herein, it will be apparent to those of ordinary skill in the art that numerous modifications in form, usage and details of implementation can be made without the exercise of inventive faculty, and without departing from those principles and concepts. Accordingly, it is not intended that the principles and concepts be limited, except as by the claims set forth below.

What is claimed is:

1. An optical channel tap assembly, comprising:
   a first N by M waveguide array including a first set of optical channels to convey optical signals along a first set of conveyance paths;
   a second N by M waveguide array including a second set of optical channels to convey the optical signals along a second set of conveyance paths, the optical signals received from the first set of conveyance paths;
   a beam splitter, disposed between the first N by M waveguide array and the second N by M waveguide array, to divert a first portion of power from the optical signals away from the second N by M waveguide array while allowing a second portion of power from the optical signals to propagate into the second N by M waveguide array; and a sheet disposed with the beam splitter, the sheet to transmit the optical signals while countering any beam walk-off caused by passage of the optical signals through the beam splitter.

2. The optical channel tap assembly of claim 1, further comprising lenses disposed between the first N by M waveguide array and the second N by M waveguide array, wherein the lenses collimate optical signals upon exiting the first set of optical channels.

3. The optical channel tap assembly of claim 1, further comprising lenses disposed between the first N by M waveguide array and the second N by M waveguide array, wherein the lenses focus optical signals to enter the second set of optical channels of the second N by M waveguide array.

4. The optical channel tap assembly of claim 1, further comprising a lens disposed between the first N by M waveguide array and the second N by M waveguide array in a telecentric arrangement with the beam splitter and the first N by M waveguide array or the second N by M waveguide array.

5. The optical channel tap assembly of claim 1, wherein the first set of optical channels or the second set of optical channels comprises an array of hollow waveguides.

6. The optical channel tap assembly of claim 1, wherein the beam splitter diverts the first portion of power from the optical signals away from the second N by M waveguide array at an angle between 0 and 90 degrees relative to the optical signals incident on the beam splitter.

7. An optical channel multi-tap assembly system, comprising:
a first optical channel tap assembly having a first beam splitter to divert a first portion of power from optical signals conveyed from a first set of optical channels of a first N by M waveguide array away from a second set of optical channels of a second N by M waveguide array while allowing a second portion of power from the optical signals to propagate into the second N by M waveguide array; and
a second optical channel tap assembly having a second beam splitter to divert a third portion of power from optical signals conveyed from a third N by M waveguide array away from a fourth N by M waveguide array while allowing a fourth portion of power from the optical signals to propagate into the fourth N by M waveguide array,
wherein the second optical channel tap assembly is optically coupled to the first optical channel tap assembly; and
wherein the first and second beam splitters divert different proportions of an optical signal such that a power of the first portion is equalized with the third portion even though the first portion is diverted from an optical signal before the third portion.

8. The optical channel multi-tap assembly system of claim 7, wherein the first optical channel tap assembly further comprises lenses disposed between the first N by M waveguide array and the second N by M waveguide array, wherein the lenses collimate optical signals upon exiting the first set of optical channels.

9. The optical channel multi-tap assembly system of claim 7, wherein the first optical channel tap assembly further comprises lenses disposed between the first N by M waveguide array and the second N by M waveguide array, wherein the lenses focus optical signals to enter the second set of optical channels of the second N by M waveguide array.

10. The optical channel multi-tap assembly system of claim 7, wherein the second optical channel tap assembly is optically coupled to the first optical channel tap assembly through a third beam splitter.

11. The optical channel multi-tap assembly system of claim 7, further comprising a first optical device optically coupled to the first optical channel tap assembly to receive the first portion of power from the optical signals.

12. The optical channel multi-tap assembly system of claim 7, further comprising at least one additional optical channel tap assembly to divert a portion of power from the optical signals, wherein each portion of power diverted from a path of the optical signals along the waveguide arrays is equal.

13. A method of making an optical channel tap assembly, comprising:
disposing a second N by M waveguide array proximate to a first N by M waveguide array, the first N by M waveguide array including a first set of optical channels to convey optical signals along a first set of conveyance paths, the second N by M waveguide array including a second set of optical channels to convey the optical signals along a second set of conveyance paths, the optical signals received from the first set of conveyance paths, wherein N and M are both greater than one; and
disposing a single unitary beam splitter between the first N by M waveguide array and the second N by M waveguide array, to divert a first portion of power from the optical signals away from the second N by M waveguide array while allowing a second portion of power from the optical signals to propagate into the second N by M waveguide array.

14. The method of claim 13, further comprising disposing lenses between the first N by M waveguide array and the second N by M waveguide array, wherein the lenses collimate optical signals upon exiting the first set of optical channels.

15. The method of claim 13, further comprising disposing lenses between the first N by M waveguide array and the second N by M waveguide array, wherein the lenses focus optical signals to enter the second set of optical channels of the second N by M waveguide array.

16. The optical channel tap assembly of claim 1, wherein the beam splitter comprises a pellicle beam splitter.

17. The optical channel tap assembly of claim 1, wherein the beam splitter is a single, unitary sheet disposed in a transmission path of all of the optical signals transmitted by the first and second waveguides.

18. The optical channel tap assembly of claim 1, further comprising at least one additional N by M waveguide and at least one additional beam splitter, a beam splitter being disposed between each pair of N by M waveguides, wherein each beam splitter diverts a different proportion of optical signals passing through the waveguides such that a power of a portion the optical signals diverted by one of the beam splitters is equal to a power of a portion of the optical signals diverted by a subsequent beam splitter.

19. The optical channel multi-tap assembly system of claim 7, wherein:
the first optical channel tap assembly diverts 25% of the optical signals;
the second optical channel tap assembly, which is encountered by the optical signals after the first optical channel tap assembly, diverts 33% of the optical signals; and
a third optical channel tap assembly, which is encountered by the optical signals after the second optical channel tap assembly, diverts 50% of the optical signals.

20. The optical channel multi-tap assembly system of claim 7, wherein at least one of the beam splitters has a sheet disposed therewith, the sheet to transmit the optical signals while countering any beam walk-off caused by passage of the optical signals through the beam splitter disposed therewith.

\* \* \* \* \*